O. EBERHARDT.

Flower-Pot.

No. {302, 31,306}

Patented Feb. 5, 1861.

Witnesses:
M. M. Livingston
C. W. Cowtan

Inventor:
Otto Eberhardt

UNITED STATES PATENT OFFICE.

OTTO EBERHARDT, OF BROOKLYN, E.D. NEW YORK.

IMPROVEMENT IN FLOWER-POTS.

Specification forming part of Letters Patent No. 31,306, dated February 5, 1861.

*To all whom it may concern:*

Be it known that I, OTTO EBERHARDT, of Brooklyn, E. D., in the county of Kings and State of New York, have invented a new and useful Improvement in Flower-Pots; and I do hereby declare that the following is a full, clear, and exact description thereof, reference being had to the accompanying drawings, making a part of this specification, in which—

Figure 1:
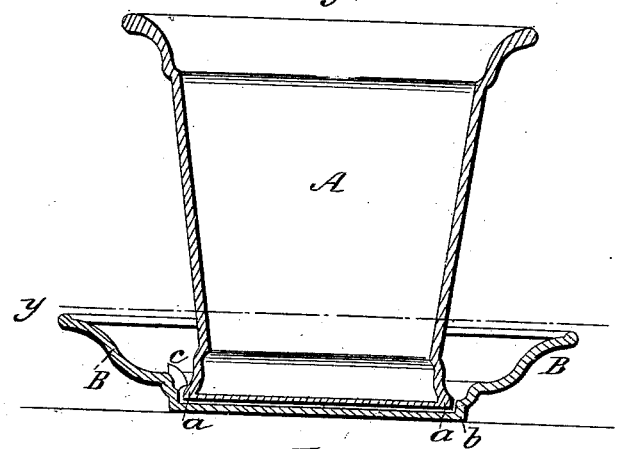
Figure 2:
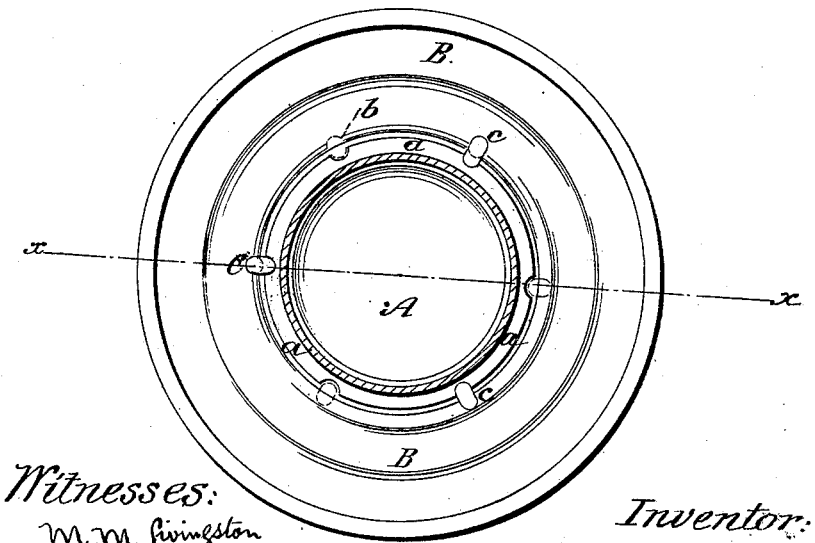

Figure 1 is a vertical section through a metallic flower-pot and saucer. Fig. 2 is a horizontal section through Fig. 1, as indicated by the red line $y\ y$.

Similar letters of reference indicate corresponding parts in both figures.

The object of this invention is to provide a simple means whereby a flower-pot can be easily attached to its saucer and detached therefrom at pleasure, so that when desirable the saucer may be secured to the bottom of the pot for giving additional base to the pot and for retaining dirt and water escaping from the pot.

My invention consists in forming on the bottom of a flower-pot a projecting flange with notches cut into it, and in forming knobs or hooks on the saucer corresponding with the notches in the flange, so that when the bottom of the pot is put between the knobs or hooks on the saucer and slightly rotated the said knobs or hooks will project over the flange on the pot and secure the saucer to the pot, as will be hereinafter explained.

To enable those skilled in the art to make and use my invention, I will proceed to describe its construction and operation.

The flower-pot A and the saucer B are made of zinc or any other suitable material, and they may be made of any desirable shape and capacity. The pot A has a flat bottom, and in its manufacture a flange, $a$, is formed around the bottom edge, as represented in Figs. 1 and 2 of the drawings. This flange $a$ projects out from the body of pot A a suitable distance, and three or more notches, $b\ b\ b$, are formed in this flange, as represented in Fig. 2. The bottom of the pot A fits into a circular recess which is formed in the bottom of the saucer B, as represented in Fig. 1, and around the upper edge of this recess, which is merely a depression in the saucer, are knobs or hooks $c\ c\ c$, which are at uniform distances apart, and which correspond to the notches $b\ b\ b$ in the flange $a$ of the pot A, as represented in Fig. 2. These knobs $c\ c\ c$ project inward and over the edge of the depression in the saucer, so that the bottom of the pot A can only be seated in the depression in the saucer by bringing the notches $b\ b\ b$ in flange $a$ to register with the knobs $c\ c\ c$. When this is done the bottom or flange $a$ of the pot A will pass down below the knobs $c\ c\ c$; and now, on giving the saucer a slight rotary motion, the flange $a$ will pass under the projecting portions of knobs $c\ c\ c$ and secure the saucer to the bottom of the pot. The notches $b\ b\ b$ also form holes in the bottom of the pot for admitting air to the roots of the plants and for allowing water to escape from the pot into the saucer.

It will now be seen from the above description that the saucer can be attached or detached from the bottom of the pot at pleasure; and when the saucer is attached it will give additional base to the pot to prevent it from casually turning over, besides serving all the advantages for which a saucer is commonly used.

Having thus described my invention, what I claim as new, and desire to secure by Letters Patent, is—

The flange $a$ on the pot, with its notches $b\ b\ b$, in combination with the corresponding knobs or projections, $c\ c\ c$, on the saucer, relatively arranged, and operating as and for the purposes herein set forth.

OTTO EBERHARDT.

Witnesses:
M. M. LIVINGSTON,
C. W. COWTAN.